(12) United States Patent
Santori et al.

(10) Patent No.: US 8,837,544 B2
(45) Date of Patent: Sep. 16, 2014

(54) QUANTUM OPTICAL DEVICE

(75) Inventors: Charles M. Santori, Palo Alto, CA (US); Andrei Faraon, Menlo Park, CA (US); Kai-Mei Fu, Palo Alto, CA (US); Victor M. Acosta, San Francisco, CA (US); Zhihong Huang, San Jose, CA (US); Lars H. Thylen, Huddinge (SE); Raymond G. Beausoleil, Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 259 days.

(21) Appl. No.: 13/284,262

(22) Filed: Oct. 28, 2011

(65) Prior Publication Data

US 2013/0107352 A1 May 2, 2013

(51) Int. Cl.
*H01S 3/17* (2006.01)
*G06N 99/00* (2010.01)

(52) U.S. Cl.
CPC .................................. *G06N 99/002* (2013.01)
USPC .............................................. 372/42; 372/92

(58) Field of Classification Search
USPC ................. 359/344, 346; 372/41, 42, 92, 372
See application file for complete search history.

(56) References Cited

U.S. PATENT DOCUMENTS

| | | | |
|---|---|---|---|
| 4,880,613 A * | 11/1989 | Satoh et al. | 423/446 |
| 6,960,779 B2 | 11/2005 | Shields et al. | |
| 7,362,420 B2 | 4/2008 | Zaugg | |
| 7,428,562 B2 | 9/2008 | Beausoleil et al. | |
| 7,447,410 B2 * | 11/2008 | Agarwal et al. | 385/129 |
| 7,554,080 B2 | 6/2009 | Munro et al. | |
| 7,778,296 B1 | 8/2010 | Vuckovic et al. | |
| 2007/0025410 A1 * | 2/2007 | Agarwal et al. | 372/94 |
| 2007/0181867 A1 * | 8/2007 | Hewak et al. | 257/4 |
| 2008/0063339 A1 * | 3/2008 | Spillane et al. | 385/14 |
| 2010/0265077 A1 | 10/2010 | Humble et al. | |
| 2012/0189026 A1 * | 7/2012 | Binkert et al. | 372/20 |

OTHER PUBLICATIONS

Andrei Faraon, Paul E. Barclay, Charles Santori, Kai-Mei C. Fu, and Raymond G. Beausoleil, "Resonant enhancement of the zero-phonon emission from a color center in a diamond cavity", arXiv:submit/0165864 [quant-ph] Dec. 17, 2010.

Andrei Faraon, Paul E. Barclay, Charles Santori, Kai-Mei C. Fu, and Raymond G. Beausoleil, "Resonant enhancement of the zero-phonon emission from a colour centre in a diamond cavity", Natore Photonics, Apr. 24, 2011.

L. C. Bassett, F. J. Heremans, C. G. Yale, B. B. Buckley, and D. D. Awschalom, "Electrical Tuning of Single Nitrogen Vacancy Center Optical Transitions Enhanced by Photoinduced Fields", arXiv:1104.3878v1 [cond-mat.mes-hall] Apr. 19, 2011.

Igal Bayn, Boris Meyler, Joseph Salzman and Rafi Kalish, "Triangular nanobeam photonic cavities in single-crystal diamond", New Journal of Physics 13, Feb. 21, 2011.

(Continued)

*Primary Examiner* — Eric Bolda

(57) ABSTRACT

A quantum device includes a resonator and a tuning structure. The tuning structure is made a material such as a chalcogenide and is positioned to interact with the electromagnetic radiation in the resonator so that a resonant mode of the first resonator depends on a characteristic of the tuning structure. The resonator is optically coupled so that a transition between quantum states associated with a defect produces electromagnetic radiation in the resonator. The characteristic of the tuning structure is adjustable after fabrication of the resonator and the tuning structure.

18 Claims, 2 Drawing Sheets

(56) References Cited

OTHER PUBLICATIONS

Andrei Faraon, Dirk Englund, Douglas Bulla, Barry Luther-Davies, Benjamin J. Eggleton, Nick Stoltz, Pierre Petroff, and Jelena Vučković, "Local tuning of photonic crystal cavities using chalcogenide glasses", Applied Physics Letters 92, 043123 (2008).

Thomas M. Babineca et al., "Design and focused ion beam fabrication of single crystal diamond nanobeam cavities", J. Vac. Sci. Technol. B 29(1), Jan. 10, 2011.

Zsolt L. Sámson, Shih-Chiang Yen, Kevin F. MacDonald, Kenton Knight, Shufeng Li, Daniel W. Hewak, Din-Ping Tsai, and Nikolay I. Zheludev, "Chalcogenide glasses in active plasmonics", Phys. Status Solidi RRL 4, No. 10, 274-276 (2010), Published online Aug. 23, 2010.

T.M. Stace, G.J. Milburn, and C.H.W. Barnes, "An entangled two photon source using biexciton emission of an asymmetric quantum dot in a cavity", arXiv:cond-mat/0211689v1 Nov. 29, 2002.

Ph. Tamarat, T. Gaebel, J. R. Rabeau, M. Khan, A. D. Greentree, H. Wilson, L. C. L. Hollenberg, S. Prawer, P. Hemmer, F. Jelezko, and J. Wrachtrup, "Stark Shift Control of Single Optical Centers in Diamond", Physical Review Letters 97, 083002 (2006).

Ranojoy Bose, Jie Gao, James F. McMillan, Alex D. Williams and Chee Wei Wong, "Cryogenic spectroscopy of ultra-low density colloidal lead chalcogenide quantum dots on chip-scale optical cavities towards single quantum dot near-infrared cavity QED", Optics Express, vol. 17, No. 25, Dec. 7, 2009.

Paul E. Barclay, Kai-Mei Fu, Charles Santori and Raymond G. Beausoleil, "Hybrid photonic crystal cavity and waveguide for coupling to diamond NV-centers", Optics Express, vol. 17, No. 12, Jun. 8, 2009.

Luca Marseglia et al., "Photonic crystal defect cavities coupled to N-V centres in diamond", ECOC 2010, Sep. 19-23, 2010.

Michael W. Lee, Christian Grillet, Cameron L.C. Smith, David J. Moss, and Benjamin J. Eggleton, "Photosensitive post tuning of chalcogenide photonic crystal waveguides", Optics Express, vol. 15, No. 3, Feb. 5, 2007.

Cabrillo, C. et al., "Creation of entangled states of distant atoms by interference", Physical Review A vol. 59, No. 2 Feb. 1999.

Tan, H.T. et al., Entangling Two Distant Nanocavities via a Waveguide, The American Physical Society Journals, Jun. 8, 2011, vol. 83, No. 6.

* cited by examiner

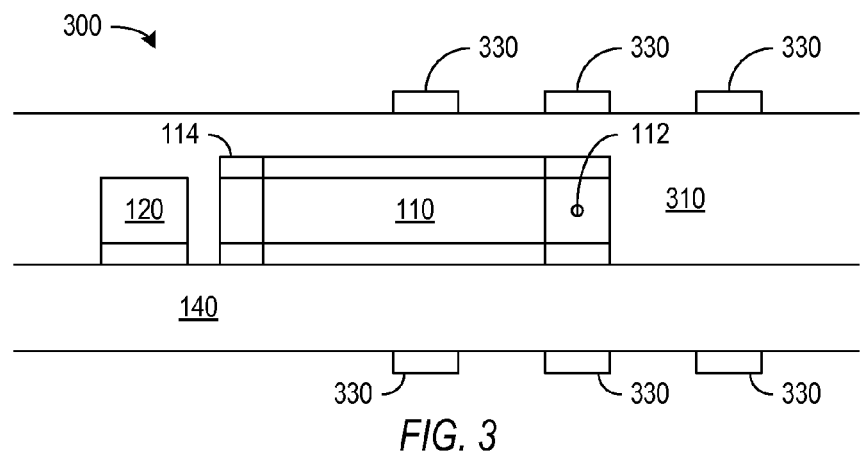
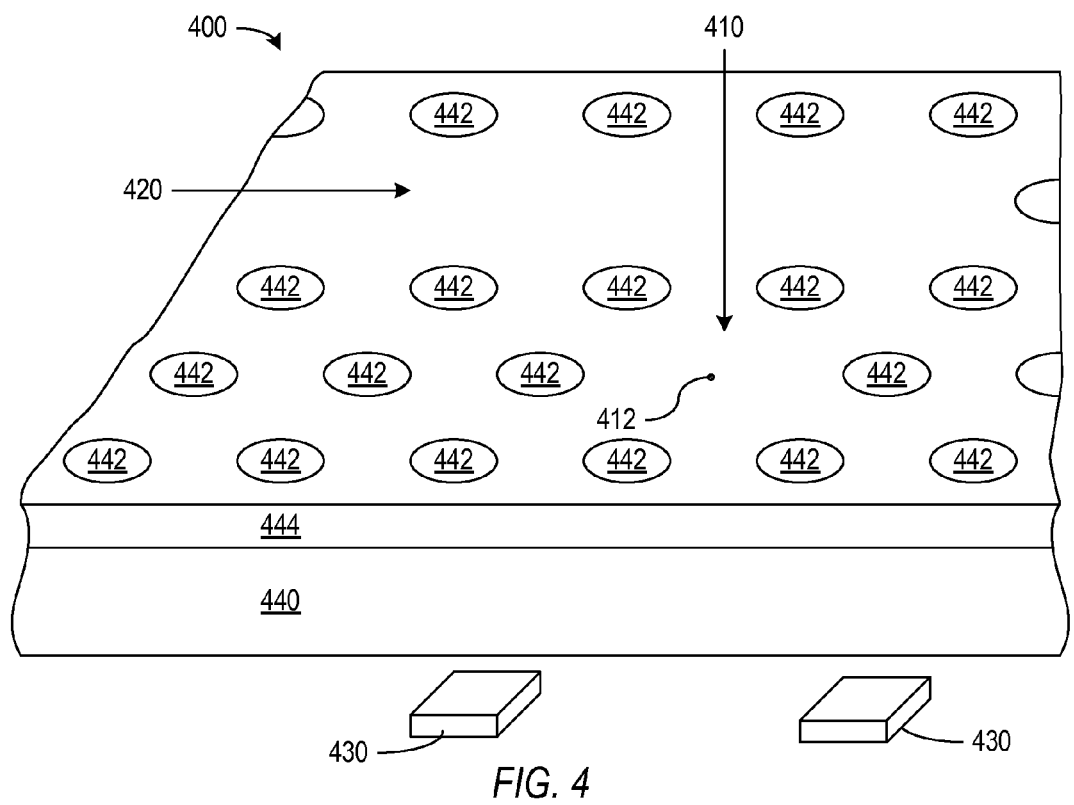

QUANTUM OPTICAL DEVICE

FEDERALLY SPONSORED RESEARCH OR DEVELOPMENT

This invention was made with government support under Contract No. HR0011-09-1-0006 awarded by the Defense Advanced Research Agency. The government has certain rights in the invention.

BACKGROUND

Nitrogen vacancy (N-V) centers in diamond are promising systems for use in quantum information processing. An N-V vacancy center is a point defect in a diamond crystal and corresponds to an adjacent pair of lattice sites including a nitrogen atom instead of a carbon atom at one lattice site and a vacancy, i.e., no atom, at an adjacent lattice site. N-V centers have localized electron spin states that can be electromagnetically manipulated, and state transitions in an N-V center produce photons with a sharp resonance frequency. An individual N-V center can be viewed as a basic quantum system for a quantum bit (sometimes referred to as a qubit). The qubit associated with an N-V center can be electromagnetically manipulated and remotely affected in a quantum information processor or other device using optical channels that interact with the N-V center. A quantum information system would normally contain multiple qubit devices (e.g., separate N-V centers) to perform desired quantum information processes.

A problem for N-V centers in diamond and for other solid-state quantum systems that interact with light is the difficulty of fabricating a set of such quantum systems that have identical optical couplings. For example, an interaction of two separated quantum systems to create an entangled state of the two devices might require that the quantum devices efficiently couple to a specific optical channel (e.g., to light with a specific frequency) employed in a quantum information processing system. Microcavities have been used to resonantly enhance the coherent part of the interactions of N-V centers with desired optical channels. However, fabricating many cavities that all have exactly the same resonance frequency, to within a fraction of a line or resonance width, as may be needed in some quantum information systems, can be difficult.

Another problem for quantum information systems that use light interactions is production of the quantum devices that have nearly the same optical transition frequency, which is necessary or desirable for consistent interactions with the optical channels employed in a quantum information system. However, random impurities and strain in a solid state quantum system can cause variation in the energies of the quantum states, resulting in differences in the transition frequencies of separate devices in the system. For example, N-V centers produced in a diamond lattice using current fabrication techniques have a typical variation in their transition frequencies of about 10 GHz in good material to more than 1000 GHz in a material with heavy damage or strain.

BRIEF DESCRIPTION OF THE DRAWINGS

FIG. 3 is a cross-sectional view of an example of a quantum device having an electrode configuration that provides control of three components of the electric field at a photoactive defect.

FIG. 4 shows an example of a quantum device using a resonator formed in a photonic crystal.

Use of the same reference symbols in different figures indicates similar or identical items.

DETAILED DESCRIPTION

A quantum optical device can employ an optical resonator (e.g., made from diamond) containing one or more optically active defects (e.g., nitrogen-vacancy centers) coupled to a resonant mode of the resonator. The resonant mode of the resonator may be tuned using a tuning layer containing a material having a refractive index or permittivity that can be modified or adjusted through application of heat, illumination, or voltage. The tuning layer may, for example, contain a chalcogenide that has a phase change that results from heating, which may be generated by illumination or applied voltage, to alter the refractive index of the chalcogenide. Further, the optical transitions of the optically active defects may be tuned through the Stark effect that is controlled through voltages applied to electrodes around the defects.

Figure 1:
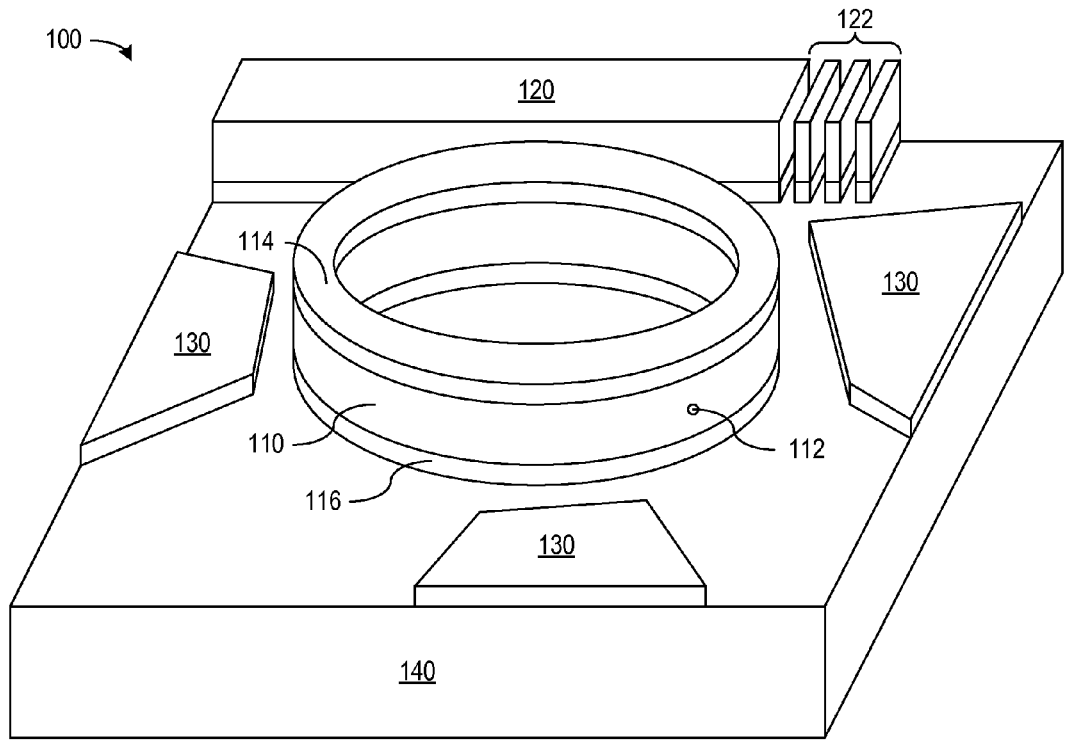
FIG. 1 shows a perspective view of an example of a quantum device having a tunable optical resonator.

FIG. 1 illustrates one implementation of a quantum optical device 100. Quantum optical device 100 includes an optical cavity or resonator 110, a waveguide 120, and electrodes 130 on a substrate 140. Substrate 140 can be any type of physical support for resonator 110 and waveguide 120, but in one configuration, substrate 140 is a quartz substrate. Alternatively, substrate 140 could be a semiconductor substrate in which electrical circuits are fabricated and connected to electrodes 130. Waveguide 120 has an optical coupling to resonator 110 and in the illustrated embodiment includes a grating reflector 122 that directs light from resonator 110 in a desired direction.

Device 100 in a typical quantum information processing application corresponds to a qubit, e.g., has a quantum state that is a linear combination of two basis states $|0\rangle$ and $|1\rangle$. To provide a physical system having quantum states suitable for quantum information processing, optical resonator 110 includes one or more defects 112. For example, in an exemplary configuration, optical resonator 110 is made of diamond that includes a nitrogen-vacancy (N-V) center as defect 112. An N-V center in diamond has several discrete quantum states corresponding to different electron and nuclear spins of the N-V center, and two of those states can be selected or assigned for use as basis states $|0\rangle$ and $|1\rangle$. For example, two out of the three possible states of the electronic spin of lowest energy in an N-V center may be used as basis states $|0\rangle$ and $|1\rangle$. The nitrogen atom, particularly nitrogen-14, that is part of an N-V center has a nuclear spin 1, meaning the nitrogen nucleus has 3 spin states. While the nuclear spin states of nitrogen-14 cannot be directly accessed optically, the nuclear spin states may be accessed through interactions with the electron spin using microwave (ESR) techniques. Similarly, diamond may include carbon-13 nuclei, which are spin-½ and have two nuclear spin states that couple to the electron spin. Nuclear spin states in N-V centers thus may be suitable for basis states $|0\rangle$ and $|1\rangle$. Other types of quantum system that might be used for defect 112 and provide suitable electron or nuclear spin states include as silicon-vacancy centers, NE8 centers, and chromium-based centers, to name a few. A physical device or property such as defect 112 or the spin of defect 112 is sometimes referred to as a "physical qubit," and several physical qubits may be used together with error correction to represent a single "logical qubit."

Figure 2:
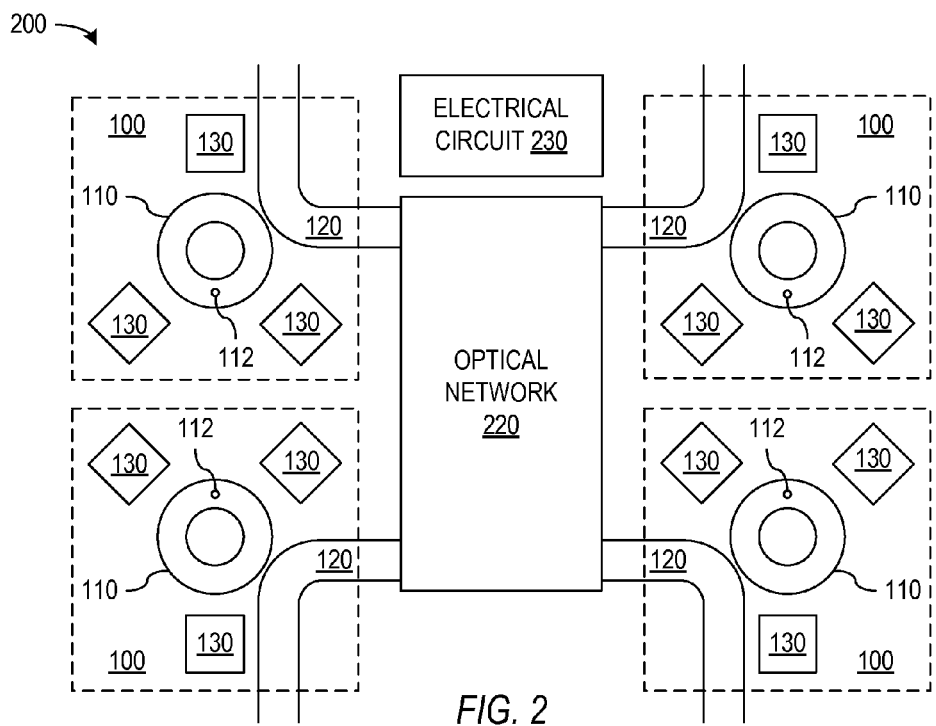
FIG. 2 shows an example of a plan view of a quantum information system containing multiple quantum devices of the type shown in FIG. 1.

Device 100, when used in a solid-state quantum information processing system, may be integrated on a chip with similar quantum devices, other types of quantum coherent devices or systems, and with classical optical or electronic devices. FIG. 2, for example, shows a plan view of an integrated quantum information system 200 containing multiple quantum optical devices 100. In system 200, waveguide 120 is part of an optical network 220 that conveys photons between quantum optical devices 100 and other devices that may be on the same chip or die. Optical network 220 can include optical switches or systems for selectively connecting quantum optical devices 100 for quantum information processing tasks. In general, optical network 220 can be of any design capable of providing optical paths between selected devices 100 without disturbing the quantum state of the photons transmitted through the optical paths including waveguides 120. For example, optical network 220 can be designed to provide an optical path between any two quantum optical devices 100, so that a photon in a coherent quantum state produced by a transition of the quantum state of defect 112 in one of the connected devices 100 can be used to produce an entangled state of the defects 112 in the two connected devices 100. Such a chip/system 200 could further serve as a building block for a larger-scale measurement-based quantum information processing system. Quantum information system 200 may more generally form all or part of a quantum information processor or a quantum communication system such as a quantum key distribution system or a quantum repeater. Electrodes 130 in each quantum optical device 100 in FIG. 2 are connected to a conventional electrical circuit 230, e.g., a control or bias circuit, that controls the voltages applied to electrodes 130 to perform functions of device 100 including but not limited to tuning of the splitting of energy states of a defect 112 in an optical resonator 110 as described further below.

In an exemplary implementation, optical resonator 110 is a microcavity made of diamond, and FIG. 1 illustrates a configuration in which resonator 110 is a ring oscillator or cavity that contains defect 112. Other implementations could employ a material other than diamond for optical resonator 110, and optical resonator 110 could have any desired shape that provides a desired resonant mode that interacts with defect 112. For example, resonator 110 could include a ring or disk resonator of a high refractive index material such as gallium phosphide on top of a diamond layer or region containing defect 112. The high-index resonator serves as a waveguide layer with an evanescent field that extends into the diamond and couples to N-V centers that are within about 50 nm of the resonator-diamond interface. In this configuration, substrate 140 could be diamond and contain defect 112. Other materials could be used in such a hybrid resonator, provided that the resonator material has a refractive index higher than that of diamond or other material containing the defect and is transparent at the wavelength of the optical transitions, e.g., 637 nm for negatively charged NV centers. Accordingly, resonator 110 could potentially be made of a material such as SiC, ZnSe, or $TiO_2$ on diamond containing defect 112. Some other cavity geometries that are compatible with diamond include 1D (nanowire) photonic crystal cavities and 2D photonic crystal cavities.

Cavity 110 in some configurations provides a high quality factor and small mode volume coupling state transitions of defect 112 into an optical mode of resonator 110. (The quality factor is the ratio of the cavity mode's central frequency to its line width, where the line width, in angular frequency units, is equal to the rate at which energy leaks out of the cavity. The mode volume may be defined as the integral over all space of the electromagnetic energy density of the cavity mode divided by maximum value of the energy density.) One purpose of cavity 110 is to increase the rate of spontaneous emission (or Raman scattering) from defect 112 into the desired mode. This increased rate is described by the dimensionless Purcell factor and is larger when the quality factor Q is larger and the mode volume is smaller. Optical resonator 110 generally enhances the coherent part of the spontaneous emission of a photon from the N-V center which occurs through the zero-phonon line. This is because, for high-Q cavities, the cavity resonance line width is a small (a few nanometers in wavelength units, centered on 637 nm) and most of the phonon sideband emission occurs in a band from about 650 nm to 750 nm, which is well outside of the cavity resonance. The photon emission in resonator 110 is coupled out of resonator 110 through waveguide 120, and similarly, a photon may be received into optical resonator 110 from waveguide 120 and interact with defect 112. A reflector such as gating reflector 122 can be use at the end of waveguide 120 to control the propagation of photons.

A layer 116 may be provided under resonator 112 for cladding of waveguides or to improve adhesion. Layer 116 may be important in some configurations of device 100. For example, if substrate 140 is transparent, layer 116 may be a cladding that may continue on the sidewalls of resonator 110. Layer 116 may thus improve the performance of resonator 110 by reducing the bending loss of light into substrate 140. This allows resonator 110 to have a smaller diameter, which increases the Purcell enhancement of spontaneous emissions. If substrate 140 is not transparent at the wavelength of the relevant optical transitions of defect 112, some transparent material is needed in between substrate 140 and resonator 110. Layer 116 could be silicon dioxide, for example, made by thermal oxidation of substrate 140 when substrate 140 is silicon.

The dimensions, shape, and material of optical resonator 110 are selected to nominally provide a resonant mode that interacts with a transition of the quantum energy states of defect 112. For example, a ring resonator having a mode corresponding to light with a wavelength of about 637 nm, i.e., at the optical transition of interest for an N-V center in diamond, may be about 3 to 4 μm in diameter, and the thickness of the diamond layer may be about 200 to 300 nm. The width of a ring forming resonator 110 or of waveguide 120 may be 250 nm, and the gap between resonator 110 and coupled waveguide 120 may be about 200 nm. However, the frequencies of the optical modes of resonator 110 are subject to manufacturing variations, so that control of the dimensions of resonator 110 during fabrication may be insufficient to provide the desired resonance. In particular, the dimensions, impurity concentration, and strain in optical resonator 110 may differ in nominally identical copies of device 100 that may be fabricated on a wafer other than wafer 140, on different chips fabricated in the same wafer 140, or even on the same chip in wafer 140. As a result, a resonant mode of resonator 110 may require tuning for effective coupling of the resonant mode and the emitted electromagnetic radiation from defect 112.

FIG. 1 illustrates an implementation in which the modes of optical resonator 110 can be tuned using a tuning layer 114, which in the implementation of FIG. 1 is on top of resonator 110. Tuning layer 114, which may have a refractive index higher or lower than the refractive index of the primary material of optical resonator 110, interacts with the resonant mode oscillations, e.g., with at least the evanescent field of electromagnetic radiation in optical resonator 110, so that the refractive index of tuning layer 114 affects the phase velocity of electromagnetic radiation in optical resonator 110 and therefore the resonant frequency of optical resonator 110. In an exemplary embodiment, tuning layer 114 has a refractive index or permittivity that can be altered by a phase change that occurs when tuning layer 114 is exposed to intense illumination or is heated or is subject to an applied voltage. In one specific implementation, tuning layer 114 is a layer of a chalcogenide, which is a chemical compound generally consisting of at least one chalcogen ion (i.e., a group 16 or group VI element such as sulfur, selenium, and tellurium) and at least one more electropositive element. One suitable material for layer 114 is GLS (gallium lanthanum sulfide), which is also transparent at 637 nm, i.e., at the optical transition of interest for an N-V center in diamond, and has a refractive index that is tunable through exposure to light with wavelength shorter than about 500 nm. Germanium antimony telluride is another chalcogenide that may be suitable for tuning layer 114 in a device containing an N-V defect. Alternatively, electro-optic polymers may be used in tuning layer 114 if the wavelength ranges are compatible.

An alternative to using a tuning layer with a tunable refractive index to tune an optical mode of resonator 110 is to alter the resonator resonance by selectively removing material from or adding material to any portion of the optical resonator 110 where the cavity mode has substantial intensity. This trimming could be done using a focused ion beam, for example, to reduce the outer diameter of resonator 110 when resonator 110 is a ring-shaped cavity. Material could be added by depositing or growing silicon dioxide, for example, on resonator 110 or by coating resonator 110 with a material such as Teflon.

A tuning process for the resonant mode can be performed when or after characterizing the initial cavity resonances of optical resonator 110. For example, optical resonator 110 after fabrication can be illuminated with an external monochromatic light source having an adjustable frequency. When the external light source approaches at the resonant frequency of optical resonator 110, the coupling efficiency of the light into resonator 110 rises dramatically. The resonance of each optical resonator 110 in a quantum information system (e.g., in system 200 of FIG. 2) can be measured. For example, if there is fluorescent material in resonators 110, the resonance of an optical resonator 110 can be determined by shining light from above to excite fluorescence inside the resonator 110. The fluorescence spectrum collected from above will show the cavity modes. Another technique for detecting the resonances is to probe the transmission spectrum through waveguide 120 to detect dips corresponding to the cavity modes of resonator 110. Yet another method for detecting resonances of a resonator 110 is to probe resonator 110 by bringing a tapered optical fiber up to the resonator 110 and measuring the tapered fiber transmission Resonators 110 that have a sufficiently high coupling to the target resonant frequency do not require tuning. Otherwise, tuning layers 114 can be independently altered or tuned on resonators 110 that because of fabrication variation or other factors have resonances that differ from the target resonance frequency. For example, targeted local irradiation or heating of a tuning layer 114 at a specific resonator 110 can systematically increase the refractive index of the tuning layer 114 until that resonator 110 exhibits resonance at the target frequency. In one type of tuning process, light that has a center wavelength within an absorption band of tuning layer 114 heats tuning layer 114, causing a small change in the refractive index. In another type of tuning process, light with a wavelength that falls inside a broad wavelength band can cause a chemical change in the local structure of tuning layer 114, resulting in a modified refractive index. In some cases, cavities 110 can be initially fabricated to intentionally have resonances that are below (or above) the target frequency, so that all cavities 110 will require at least some tuning to increase (or decrease) their resonant frequencies.

The transition energy of defect 112 in quantum optical device 100 of FIG. 1 is also tunable. In particular, electrodes 130 are positioned to apply an electric field to defect 112 to tune the transition energy of defect 112 through a mechanism commonly referred to as the Stark effect. In general, variations in the fabrication process of quantum optical device 100 can cause different devices 100, even devices 100 that are fabricated using the same design and the same process, to have different energy levels. However, after fabrication, the emissions from each defect 112 can be measured for a range of applied electric fields to identify applied electrode voltages that provide an emission frequency that corresponds to a target frequency. For example, resonator 110 may be tuned to have a resonant mode corresponding to the target frequency as described above and then electrode voltages that produce emitted electromagnetic radiation in the resonant mode of resonator 110 can be identified. The static voltages applied to electrodes 130 when emissions are at the target frequency can be stored, e.g., in non-volatile memory (not shown) in electrical circuit 230 of FIG. 2, and electrical circuit 230 can bias electrodes 130 in each device 100 to provide the particular electric field that causes that specific device 100 to emit electromagnetic radiation having the target frequency.

With the Stark effect, a static applied electric field generally shifts and splits the energy levels of a charged system due to the interaction of the different charge distribution associated with the different quantum states of the charged system. The splitting and change in the transition energy generally depends on the magnitude and direction of the applied electric field. Accordingly, it may be useful to have control of all three components of the electric field vector at the position of defect 112 since the alignment of the electric field relative to a symmetry axis of defect 112 can affect the detailed change in the energy level structure. Nevertheless, FIG. 1 illustrates a simple in-plane array of electrodes 130 to control the magnitude of the electric field and the direction of the electric field in two dimensions. FIG. 3 shows a cross-sectional view of a quantum device 300 having electrodes 330 arranged above and below optical resonator 110 in addition to being spaced laterally on top and bottom surfaces to enable control of all three components of the electric field at the location of a defect 112. Different voltages may be respectively applied to electrodes 330 to create an electric field pointing in a direction controlled by the differences in the voltages and the positions of electrodes 330.

FIG. 3 also illustrates that optical resonator 110 may be contained in a layer 310 of dielectric material having a lower refractive index than optical resonator 110 or waveguide 120 to provide cladding to help limit and control the propagation of light. Another implementation of a quantum device can provide an N-V center or other photoluminescent defect in or adjacent to a resonator provided in a photonic crystal, sometimes referred to as a photonic bandgap crystal. A photonic crystal generally includes a structure having a refractive index that varies according to a pattern (generally a two-dimensional or three-dimensional pattern using features that are smaller than the wavelength of the light controlled). The variations in the refractive index in a photonic crystal cause destructive interference and prevent propagation within the photonic crystal of light of a target frequency. The refractive index variations can be created in a layer of material, for example, by etching holes in the material or treating areas of the material so that the refractive index in the holes or treated areas differ from the refractive index of the material. Waveguides or resonators (in which light of the target wavelength can be confined) may be provided in a photonic crystal by altering the pattern of the refractive index in areas where waveguides or resonators are desired. Current processing techniques for materials such as diamond can provide feature sizes that are sufficiently small to create photonic crystals that control visible light, and techniques are known for creating two dimensional and three dimensional photonic crystals including waveguides and resonators. For example, I. Bayn et al., "Triangular nanobeam photonic cavities in single-crystal diamond," New Journal of Physics 13, 025018 (2011) describes some techniques for processing diamond and is hereby incorporated by reference in its entirety.

FIG. 4 shows a quantum device 400 including a resonator 410 in a photonic crystal. The photonic crystal may be formed in a layer 440 of a material such as diamond in which a photoluminescent defect 412 can be provided. In particular, holes 442 can be formed in layer 440 so that the refractive index alternates between the refractive index of the material of layer 440 and the refractive index of air or a material filled into holes 442. The pattern of holes 442 are such that light of a target wavelength (e.g., 637 nm) experiences total destructive interference except in an area forming a resonator 410 and an area 420 forming a waveguide. Such areas where the pattern refractive index variation is altered are sometimes referred to as defects in the photonic crystal because the waveguides and resonators disrupt the uniformity of the pattern of refractive index variations, but these "defects" in the photonic crystal should be distinguished from structures such as N-V centers, which correspond to defects in a molecular crystal structure. As in the quantum device of FIG. 1, resonator 410 and waveguide 420 are positioned adjacent to each other to provide an optical coupling. As a result, light emitted from defect 412 in resonator 410 couples into waveguide 420 and can be transmitted to another quantum device, and light from waveguide 420 can couple into resonator 410 and interact with defect 412.

In one configuration, air or vacuum would be under diamond layer 440, and layer 440 is a suspended membrane with holes. This can be achieved if layer 440 is initially formed on a layer of a sacrificial material such as silicon dioxide on a silicon substrate (not shown). Such a structure can be exposed to HF (hydrofluoric acid) which passes through the holes in layer 440 and etches the portions of the sacrificial layer underneath the holes. The duration of the HF etch can be limited so that the sacrificial material immediately underneath the photonic crystal is removed, but membrane layer 440 remains attached to the supporting substrate at its periphery and does not collapse. In this case the bottom electrodes 430 might be doped silicon in the underlying substrate.

Quantum device 400 further includes a tuning layer 444. Layers 440 and 444 may be sufficiently thin (e.g., collectively less than 100 nm) that light of the target wavelength propagates according to a refractive index based on the combined characteristics of layers 440 and 444. Accordingly, layers 440 and 444 may have the same pattern of holes 442, or alternatively, holes 442 may be in only one of layers 440 and 444. Tuning layer 444 can be made of a chalcogenide or another material that has a refractive index or permittivity that can be locally altered by a phase change that occurs in a targeted region when the targeted region of tuning layer 444 is exposed to intense illumination or is heated. The resonant frequency of resonator 410 can thus be locally changed or tuned to a desired frequency by illuminating or heating layer 444 in the area of resonator 410. The amount of illumination or heating used is generally selected according to a desired change in the resonant frequency of resonator 410. This tuning can be performed in the same general manner described above.

Quantum device 400 also includes electrodes 430 that can be independently biased to control an electric field at the location of defect 412 and thereby tune the frequency of light emitted when the quantum state of defect transitions from a higher energy state to a lower energy state. Device 400 thus has the ability to tune both the resonator mode frequency and the optical transition frequency of the quantum system, which can be important for defect-tolerant quantum networks.

Although the invention has been described with reference to particular implementations, the description is only an example of the invention's application and should not be taken as a limitation. Various adaptations and combinations of features of the implementations disclosed are within the scope of the invention as defined by the following claims.

What is claimed is:

1. A quantum optical device comprising:
   a first resonator;
   a defect structure containing a first defect, wherein a transition between quantum states associated with the first defect produces electromagnetic radiation in the first resonator;
   a first tuning structure positioned to interact with the electromagnetic radiation in a resonant mode of the first resonator so that a frequency of the resonant mode of the first resonator depends on a characteristic of the first tuning structure, wherein the characteristic of the first tuning structure is adjustable after fabrication of the first resonator;
   a second resonator optically coupled to a second defect so that a transition between quantum states associated with the second defect produces electromagnetic radiation in the second resonator; and
   a second tuning structure positioned to interact with the electromagnetic radiation in the second resonator so that a resonant mode of the second resonator depends on a characteristic of the second tuning structure, wherein the characteristic of the second tuning structure is adjustable independently of the characteristic of the first tuning structure.

2. The device of claim 1, wherein the defect structure comprises diamond, and the first defect comprises a nitrogen-vacancy center in the diamond.

3. The device of claim 1, wherein the first tuning structure comprises a chalcogenide layer.

4. The device of claim 3, wherein the chalcogenide layer comprises gallium lanthanum sulfide or germanium antimony telluride.

5. The device of claim 1, wherein the characteristic of the first tuning structure is a refractive index of the first tuning structure.

6. The device of claim 5, wherein the refractive index of the first tuning structure is adjustable through heating or irradiation of the first tuning structure.

7. The device of claim 1, further comprising an optical network including:
   a first waveguide positioned to couple electromagnetic radiation in and out of the first resonator; and
   a second waveguide positioned to couple electromagnetic radiation in and out of the second resonator.

8. The device of claim 1, wherein the first resonator is in a photonic crystal.

9. The device of claim 1, further comprising:
a plurality of electrodes adjacent to the first defect; and
an electrical circuit connected to bias the electrodes to create an electric field at the first defect, wherein the electric field at the first defect alters the transition between the quantum states associated with the first defect so that the electromagnetic radiation produced by the transition is in the resonant mode of the first resonator.

10. The device of claim 1, wherein the defect structure and the first defect are in the resonator.

11. A process comprising:
fabricating a device containing a plurality of resonators of a first material, and a plurality of tuning structures of a second material, each of the tuning structures being positioned to interact with electromagnetic radiation in a corresponding one of the resonators, wherein each of the resonators is optically coupled to a corresponding defect from a plurality of defects in a defect structure so that a transition between quantum states associated with the corresponding defect produces electromagnetic radiation in the resonator, and a resonant mode of each of the resonators depends on an adjustable characteristic of the tuning structure corresponding to the resonator;
adjusting the characteristic of a first tuning structure from the plurality of tuning structures so that the resonant mode of a first resonator from the plurality of resonators corresponds to a target frequency of electromagnetic radiation; and
adjusting the characteristic of a second tuning structure from the plurality of tuning structures independently of the adjusting of the characteristic of the first tuning structure and so that the resonant mode of a second resonator from the plurality of resonators corresponds to the target frequency.

12. The process of claim 11, further comprising applying an electric field to a first defect from the plurality of defects, wherein the electric field causes the transition between quantum states associated with the first defect to produce electromagnetic radiation having the target frequency.

13. The process of claim 11, wherein the defect structure comprises diamond.

14. The process of claim 13, wherein the first defect comprises a nitrogen-vacancy center in the diamond.

15. The process of claim 11, wherein the second material comprises a chalcogenide.

16. The process of claim 11, wherein adjusting the characteristic of the first tuning structure comprises altering a refractive index of the first tuning structure until the resonant mode of the first resonator corresponds to the target frequency.

17. The process of claim 11, wherein:
adjusting the characteristic of the first tuning structure is in response to measurements of the resonant mode of the first resonator; and
adjusting the characteristic of the second tuning structure is in response to measurements of the resonant mode of the second resonator.

18. The device of claim 1, wherein the first resonator comprises a ring-shaped cavity.

* * * * *